(12) United States Patent
Takacs (10) Patent No.: US 10,333,586 B2
(45) Date of Patent: Jun. 25, 2019

(54) LAMP POWER LINE COMMUNICATION

(71) Applicant: SORAA, INC., Fremont, CA (US)

(72) Inventor: Laszlo Takacs, Fremont, CA (US)

(73) Assignee: SORAA, INC., Fremont, CA (US)

( * ) Notice: Subject to any disclaimer, the term of this patent is extended or adjusted under 35 U.S.C. 154(b) by 46 days.

(21) Appl. No.: 15/592,729

(22) Filed: May 11, 2017

(65) Prior Publication Data

US 2017/0331519 A1    Nov. 16, 2017

Related U.S. Application Data

(60) Provisional application No. 62/334,644, filed on May 11, 2016.

(51) Int. Cl.
| | |
|---|---|
| *H05B 33/08* | (2006.01) |
| *H05B 37/02* | (2006.01) |
| *H04B 3/54* | (2006.01) |
| *H04B 3/56* | (2006.01) |

(52) U.S. Cl.
CPC ............. *H04B 3/54* (2013.01); *H04B 3/542* (2013.01); *H04B 3/56* (2013.01)

(58) Field of Classification Search
None
See application file for complete search history.

(56) References Cited

U.S. PATENT DOCUMENTS

2010/0084992 A1* 4/2010 Valois ............... H05B 37/0254
315/291
2010/0213759 A1* 8/2010 Covaro .................. H04B 3/542
307/1

* cited by examiner

*Primary Examiner* — Dedei K Hammond
(74) *Attorney, Agent, or Firm* — Fisherbroyles LLP (57) ABSTRACT

A method for transmitting data over a power signal to at least one lamp, said power signal comprising alternating high-power and low-power sections, said method comprising: modulating said power signal in one or more interface regions based upon at least one data symbol to generate a modulated signal having one or more modulated portions, each modulated portion having a first average power, each of said interface regions comprising adjacent portions of a high-power section and a low-power section, said adjacent portions having a second average portion; wherein said first average power is about the same as said second average power.

26 Claims, 9 Drawing Sheets

LAMP POWER LINE COMMUNICATION

REFERENCE TO RELATED APPLICATION

This application claims priority to U.S. Provisional Application No. 62/334,644, filed May 11, 2016, hereby incorporated by reference.

FIELD OF INVENTION

The invention relates generally to lamps, and, more specifically, to a method and system for communication between a lamp and a transformer.

BACKGROUND

Modern lamps such as LED lamps may operate as intelligent lighting devices to react to environmental conditions, such as temperature and ambient light. To facilitate this intelligent operation, the lamps generally need to communicate with the outside world. For example, intelligent lighting devices may need to communicate their state to the outside world, or to receive information from external devices, such as transformers. Typically, a microprocessor in the intelligent lighting devices facilitates this communication.

Most lamps, especially conventional lighting devices, do not have a mechanism for exchanging data or control signals. Typically, the only means of communication with a lamp, such as an LED lamp, is through the power line, and signals transmitted over power lines are usually analog signals. However, data signals are typically exchanged digitally.

While some conventional approaches attempt to modulate an analog signal to exchange data between a lighting element and an external device, this can be problematic, especially for LED devices where the integrity of the analog signal is critical to the lighting characteristics of the lamp. For example, dropouts and any other profile characteristics of a modulated analog signal can cause flickering or other unwanted artifacts, which diminish the quality and integrity of the light of the LED device.

Therefore, Applicants have identified the need to communicate with a lamp without the signal interfering with the lighting characteristics of the lamp. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the present invention relates to a method for transmitting data over a power signal to at least one lamp, the power signal comprising alternating high-power and low-power sections, the method comprising: modulating the power signal in one or more interface regions based upon at least one data symbol to generate a modulated signal having one or more modulated portions, each modulated portion having a first average power, each of the interface regions comprising adjacent portions of a high-power section and a low-power section, the adjacent portions having a second average portion; wherein the first average power is about the same as the second average power.

In another embodiment, the present invention relates to a system for performing the above-mentioned method.

In yet another embodiment, the present invention relates to a method for transmitting data from an LED lamp coupled to a power source, the method comprising: selectively coupling a resistor in the LED lamp to the power source based upon at least one data symbol, wherein the selectively coupling causes a modulation of a current on a power line.

In still another embodiment, the present invention relates to a system for performing the above-mentioned method.

In yet another embodiment, the present invention relates to a method for bi-directional data communication between a power-side component and a powered device over a common metallic link using different communication protocols. In one embodiment, the method comprises transmitting first data to the powered device by modulating the power signal in one or more interface regions based upon at least one first data symbol to generate a first modulated signal having one or more modulated portions, each modulated portion having a first average power, each of the interface regions comprising adjacent portions of a high-power section and a low-power section of the power signal, the adjacent portions having a second average portion, wherein the first average power is about the same as the second average power; and transferring second data to the power-side component by the powered device selectively coupling a resistor in the powered device to the power line based upon at least one second data symbol to generate a second modulated signal.

In still another embodiment, the present invention relates to a bi-directional data communication system for bi-directional data communication between a power-side component and a powered device over a metallic link. The system comprises a power-side component configured to transmit first data to a powered device by modulating a power signal with the first data over a powerline; and a powered device configured to receive and demodulate the first data and configured to transmit second data to the power-side component by selectively invoking a resistor to provide impendence modulation; wherein the power-side component is also configured to sense the impendence modulation and decode the second data.

DETAILED DESCRIPTION

Figure 1:
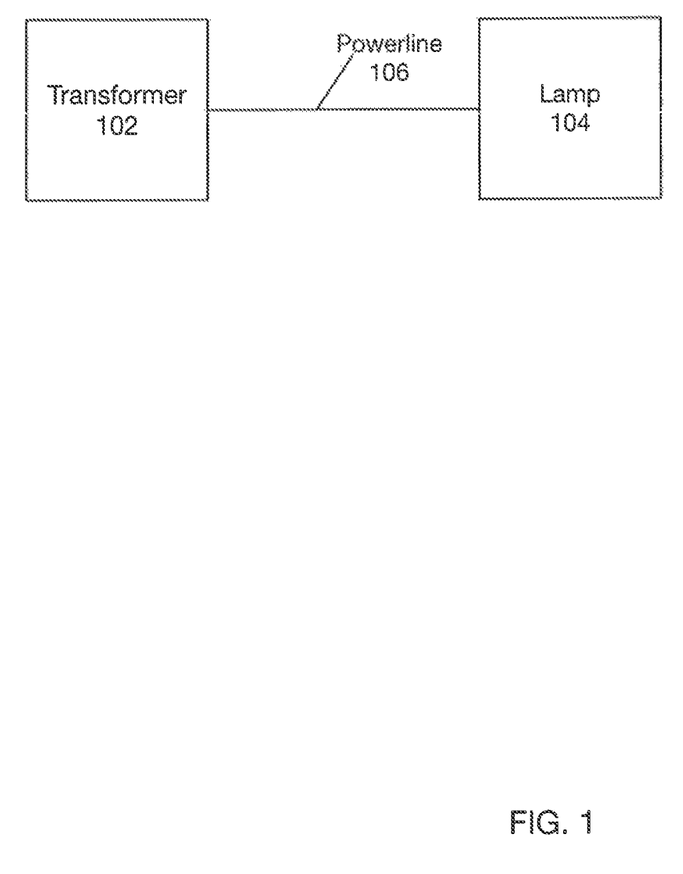
FIG. 1 is a schematic of one embodiment of the system of the present invention.
Figure 2A:
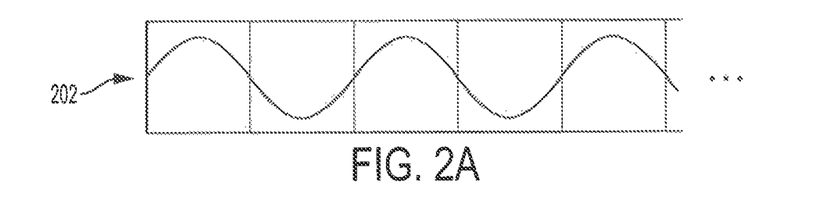
FIG. 2A shows an alternating current ("AC") line signal that may be used to power a lighting element such as an LED lamp according to one embodiment.
Figure 2B:
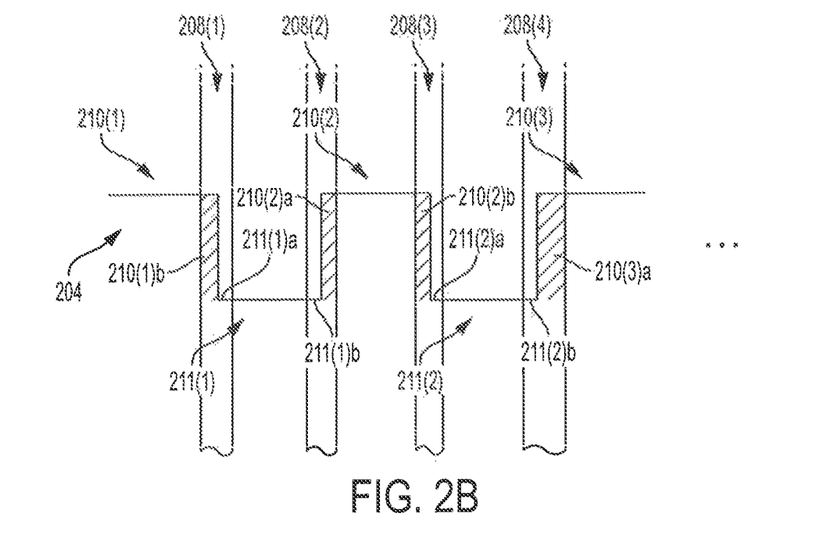
FIG. 2B shows a pulsed variable signal 204 generated from the AC line signal of FIG. 2A, which may be used to power a lighting element such as an LED lamp according to one embodiment.
Figure 2C:
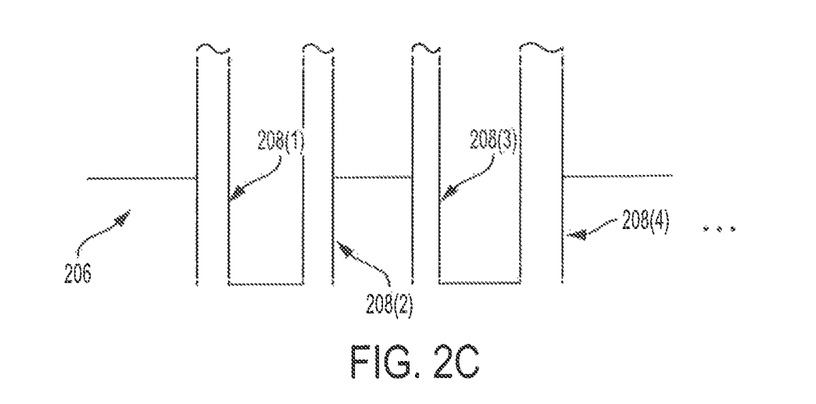
FIG. 2C shows a more realistic depiction of a pulsed variable signal 204 according to one embodiment.

In one embodiment, the present invention relates to a modulating a power signal to communicate with a lamp. Referring to FIGS. 1 and 2A-2E, one embodiment of the method of the invention is illustrated for transmitting data from a transformer 102 over a power line 106 to at least one LED lamp 104 (FIG. 1). Specifically, the method involves modulating a power signal 204 having alternating high and low energy sections 210(1), 211(1), 210(2), 211(2), 210(3). The power signal 204 in the embodiment of FIG. 2B is a DC signal derived by rectifying an AC signal 202 as shown in FIG. 2A. It should be understood, however, that the power signal may be any signal (e.g., AC or DC), providing that it has alternating high and low energy sections 210(1), 211(1), 210(2), 211(2), 210(3).

Figure 2D:
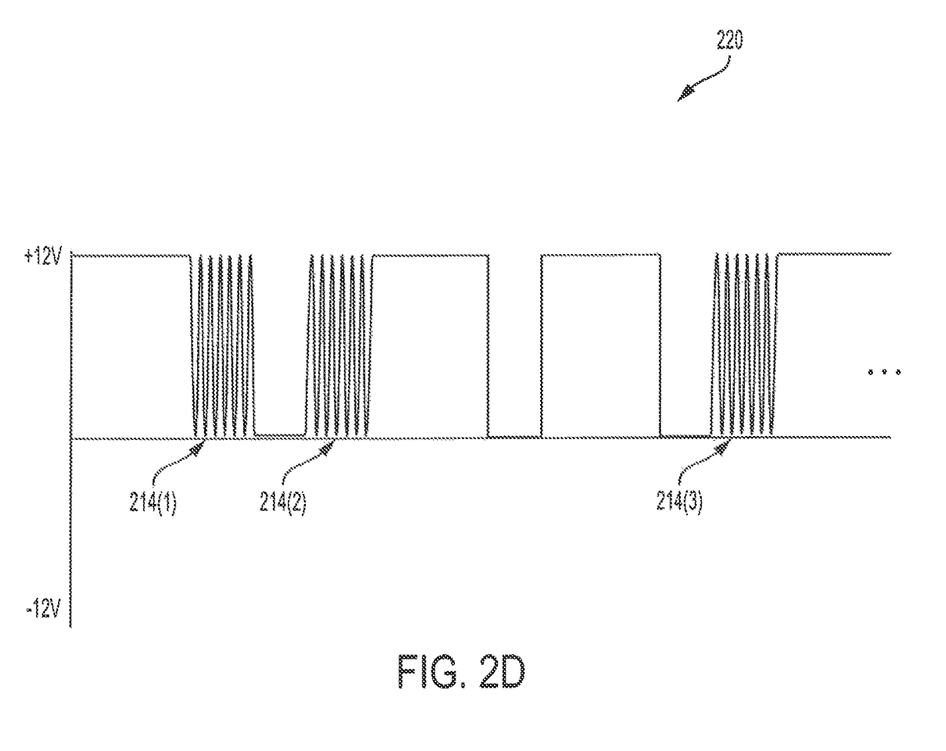
FIG. 2D shows a modulated signal 204 utilized to transmit data into a lighting element such as an LED lamp according to one embodiment.
Figure 2E:
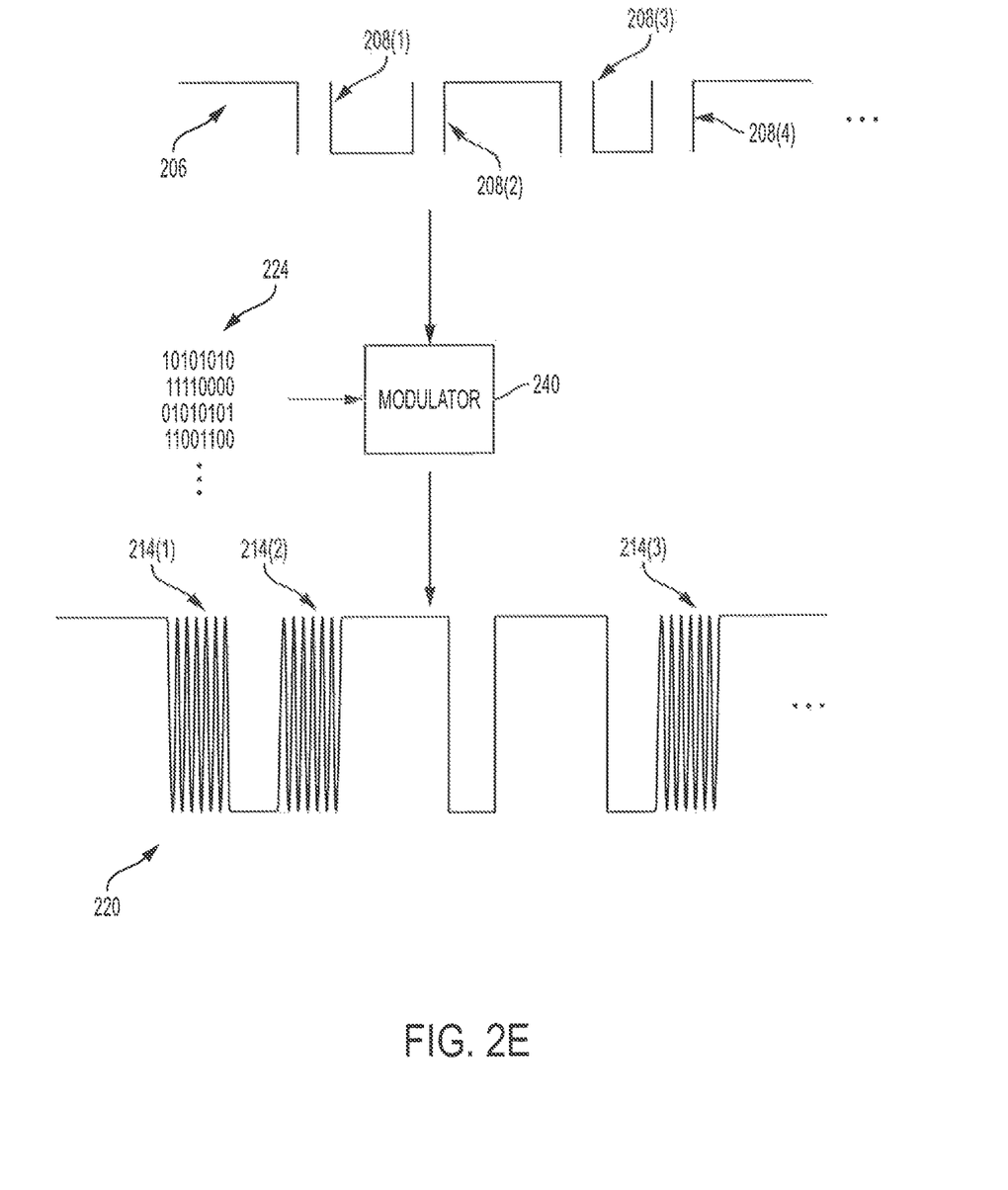
FIG. 2E depicts a process of generating a modulated pulsed DC signal from a pulsed variable signal 204 with high and low-power sections according to one embodiment.

The method comprises modulating the power signal 204 in one or more interface regions 208(1), 208(2), 208(3), 208(4), based upon at least one data symbol 224 to generate a modulated signal 220 having one or more modulated portions 214(1), 214(2), 214(3) (see FIG. 2E). Each modulated portion has a first average power. Each of the interface regions comprises adjacent portions of a high-power section and a low-power section 210(1)b+211(1)a, 211(1)b+210(2)a, 210(2)b+211(2)a, and 211(2)b+210(3)a (see FIG. 2B). The adjacent portions of each interface portion having a second average energy. In one embodiment, the first average power is about the same as the second average power. As used herein in this context, the term "about" means less than 20% difference. In one embodiment, the first average power is within 15, 10, 5, or 1% of the second average power. In yet another embodiment, the high-power section 210, from which the adjacent portion of the high power section is derived, has a third average power and the first average power is no less than 50, 40, 30, 20, 10, or 5% of the third average power.

Therefore, in one embodiment, the present invention involves defining an interface region, which includes adjacent portions of high and low-power sections, and modulating those adjacent portions. Because the interface region includes a portion of a low-power section and an adjacent portion of the high-power section, the signal in the interface region can be modulated and spread over the interface region without significantly changing the average power of the interface region relative to the unmodulated signal in the same interface region. Because the average power of the modulated signal remains essentially the same in the interface portions, the lamp sees very little power variation in the power signal, and, thus, flicker or dropout is reduced. The figures are described in greater detail below.

FIG. 2A shows an alternating current AC line signal that may be used to power a lighting element such as an LED lamp according to one embodiment. AC signal 202 may typically be received from a typical consumer or industrial power source. As shown in FIG. 2A, AC signal 202 may be 120 Hz 12 V signal according to one embodiment. It should be understood that AC signal 202 is merely exemplary, and the present invention is compatible with any signal regardless of its frequency or amplitude, providing it has high and low-power sections.

FIG. 2B shows a pulsed DC signal 204 generated from the AC line signal 202, which may be used to power a lighting element such as an LED lamp according to one embodiment. The pulsed variable signal 204 may be generated by passing AC signal 202 through a chopper, or using any other known rectifying technique. Note that pulsed variable signal 204 exhibits periods of constant maximum amplitude in high-power sections 210(1), 210(2), 210(3), and constant minimum amplitude in low-power sections 211(1), 211(2).

Although not depicted in FIG. 2B, the variable signal 204 shown is idealized. Typically, a pulsed variable signal 204 may have regions of transition between maximum and minimum amplitude, which occur over some finite time interval. That is, the transitions between maximum and minimum amplitude do not occur necessarily instantaneously. In particular, a pulsed variable DC exhibits often at least two characteristics that are not shown with respect to pulsed variable signal 204 of FIG. 2B. First, typically, the high-power sections 210(1)-(3) and low-power sections 211(1)-(2) shown in FIG. 2B tend to exhibit some variation, but nevertheless, exhibit a relatively low rate of change, and have an average power that does not vary appreciably.

Some substantially constant sections (e.g., high-power sections 210(1)-210(3)) in the pulsed variable signal 204 exhibit a high voltage value, while other substantially constant sections (e.g., low-power sections 211(1)-211(2)) exhibit a low voltage value. The high value may be, for example, on the order of +1V, +10V (for instance, +12V) or +100V. The low value may be, for example, close to zero (e.g. zero, or less than 10% or 1% of the high voltage value) or may be negative on the order of, for example, −1V, −10V, −12V or −100V.

FIG. 2D shows a modulated signal 220 to transmit data into a lighting element such as an LED lamp according to one embodiment. According to one embodiment, modulated signal 220 is derived from variable signal 204 with high and low-power sections. In particular, the variable signal 204 is modulated in the interface regions (e.g., regions 208(1)-208(4)) in FIG. 2C, which comprise adjacent portions of high and lower power sections, which are modulated to generate modulated signal 220 shown in FIG. 2D. Accordingly, interface regions 208(1)-208(4) of signal 204 in FIG. 2B become modulated regions 214(1), 214(2), and 214(3) of modulated signal 220 of FIG. 2D.

As shown in FIG. 2E, pulsed DC signal with high and low-power sections 206 is provided to modulator 240. In turn, modulator 240 generates as output modulated pulsed DC signal 220. According to one embodiment, symbol patterns 224, which are provided to modulator 240, are used by modulator 240 to modulate pulsed variable signal 204 206. According to one embodiment, symbol patterns 224 utilize an equal number of one bits and zero bits. As described below, this particular choice of symbol patterns facilitates a generation of a particular profile for modulated pulsed DC signal 210 that minimizes flicker or other degradation effects when modulated pulsed DC signal 210 is used to drive a lighting device such as an LED lamp. Note that the waveforms depicted in FIG. 2E are merely exemplary and are not intended to limit the scope of the invention.

The invention is compatible with the myriad of potential signal profiles. According to one embodiment, a DC power level of very close to 12 Volts which is interrupted by the data briefly on a 120 Hz overall period is utilized.

Modulated signal 220 shown in FIG. 2D is exemplary and is not meant to limit the scope of the types of signals or signal profiles, which may be utilized in accordance with the principles and concepts of the present invention. An important feature is that data symbols are modulated onto pulsed variable signal 204 in interface regions (e.g., 208(1)-208(4)) in such a way that a coupled lamp such as an LED does not suffer any degradation in lighting quality or output due to the modulation of the signal with data symbols.

In various embodiments, variable signal 204 is characterized by periodic alternative high and low-power sections having a relatively low frequency. This low frequency may be on the order of 100 Hz (for instance, it may be 120 Hz or 240 Hz if it is derived from a wall-plug AC signal). According to alternative embodiments, the low frequency may range from 10 Hz to 500 Hz. The interface regions 208 of signal 204 are modulated at a relatively high frequency for data transmission. In some embodiments, the high frequency is at least 10 times the low frequency. In some embodiments, the high frequency is at least 1 kHz, 5 kHz, 10 kHz, 50 kHz, 100 kHz, 500 kHz, or 1 MHz, which yields a desired data transmission rate. In some embodiments, the high frequency is maintained within an upper bound such that radiative losses are low and the power line conductor functions as an RF transmission line. For example, according to one embodiment, the high frequency is no more than 50 kHz, 100 kHz, 500 kHz, 1 MHz, 5 MHz, 10 MHz, 50 MHz or 100 MHz. In other embodiments, the high frequency is selected to carry data at a desired rate. In an exemplary embodiment, the low frequency is 120 Hz and the fast frequency is 10 kHz. In other embodiments, the alternating high and low-power sections are not periodic but pseudo-periodic.

In yet other embodiments, modulated signal is characterized by relatively long high and low-power sections and short interface regions. For example, each high and low-power section may have a duration of 10 ms, while the duration of the interface region may be much shorter, for example, 1 ms or less, or about 10, 1, or 0.1% of the duration of a high/low-power section. In some embodiments, interface regions of pulsed DC signal only occupy a fraction ("filling fraction") of the total time in modulated pulsed DC signal 220. For instance, according to one embodiment, no more than 50% of the total time spanned by signal 204 is occupied by interface regions. In other cases, the filling fraction may be no greater than 20%, 10%, 5%, 2%, 1%, 0.5%, or 0.1% of the total time of the variable signal. In some embodiments, the filling faction and the modulation frequency may be selected together to achieve a desired data transfer rate.

In some embodiments, only a portion of an interface region of pulsed DC signal is modulated with data. In some embodiments, modulation of the interface region occurs only when information needs to be communicated to the lamp, and, thus, not all of the interface regions are modulated. For example, interface region 208(3) in FIG. 2E is not modulated.

The nature of the symbols and their respective bit patterns that are modulated onto variable signal 204 may be important in the context of LED lighting elements and in particular in preserving the lighting quality of LED devices. In particular, the nature of the power signal utilized to power LED devices is important to minimizing any flicker or other undesirable artifacts. According to one embodiment, the data symbols modulated onto pulsed signal include an equal number of '0' and '1' bits in order to prevent flicker or other undesirable effects in the output of a lamp. This equal number ensures that a controlled total power is present in the signal in interface regions. This controlled power is averaged by a receiving LED lamp into a well-controlled light output, thus avoiding flicker. A constant average number of 0s and 1s can be easily implemented. For example, if there are a total of eight bits in a byte, the number of 1s and 0s can be four. According to this example, any of the following bytes will be transmitted with approximately equal energy: 11110000, 01111000, 00111100, 10101010, 01010101, 00110011, etc.

In some embodiments, an LED lamp may include a 2-stage driver. As disclosed in U.S. patent application Ser. No. 14/751,065, a 2-stage driver can accommodate the pulsed signal described in embodiments of this application and can be used to interpret data contained in the signal. The use of a 2-stage driver provides significant advantages in that any small mismatches in energy transfer due to an inexact equal number of 1s and 0s will nevertheless exhibit steady light output due to the action of the second-stage driver. In this case the energy fluctuations are transferred to an intermediate capacitor voltage, which can tolerate small fluctuations without introducing flicker in the outputted light. The overall effect of using the present invention in conjunction with a two-stage driver is an increase in the number and type of symbols that can be transmitted without causing the lamp to flicker, and hence an increase in the communication data rate. In this scenario, it would be possible to expand the symbol set by transmitting a byte with only 3 is if it is followed by a byte that transmits 5 1s. In this way, according to this example, an average of 4 bits per byte is still maintained. In general, some embodiments of the invention utilize a number of 1s and 0s that is maintained on average, over several bytes. In some embodiments, the average is maintained over 2, 4, 8, 16, 32, 64, or 128 bytes.

The signals shown previously display constant high-power and low-power sections. It should be understood, however, that substantially constant sections 210, 211 need not have a strictly constant power. In some cases, they may retain small ripples. For instance, the power within a substantially constant section may vary by +/−20%, +/−10%, +/−5%, +/−2%, +/−1%. In some cases, substantially constant sections have a slow slope, where for instance, the power rises or decreases by 40%, 20%, 10%, 5%, 2%, or 1% across a substantially constant section. However, this variation is not utilized for encoding data, in contrast to interface regions where the variation is utilized for encoding data.

Figure 2F:
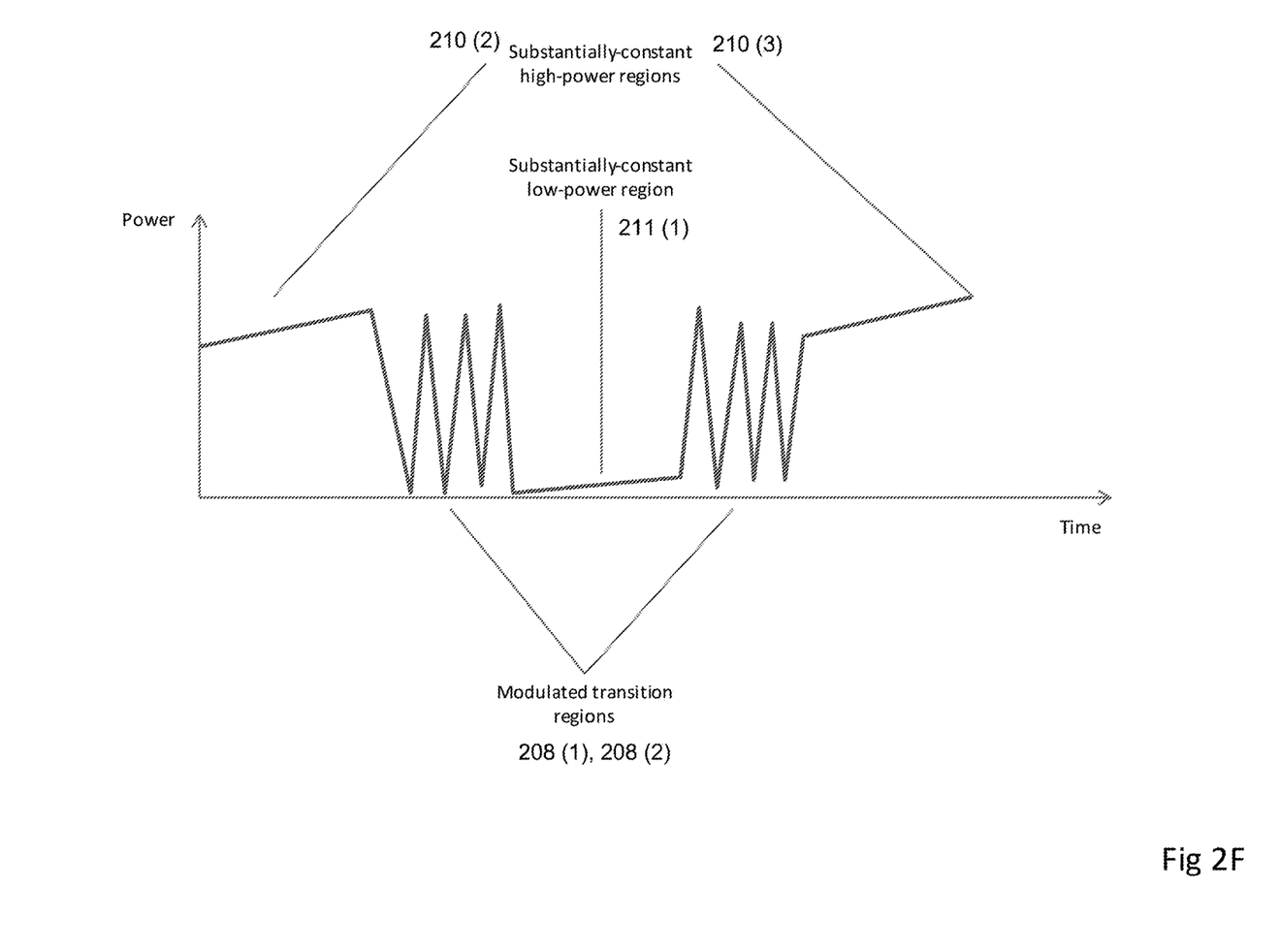
FIG. 2F shows a signal that exhibits constantly rising power over high-power sections and constantly decreasing power over low-power sections according to one embodiment.
Figure 2G:
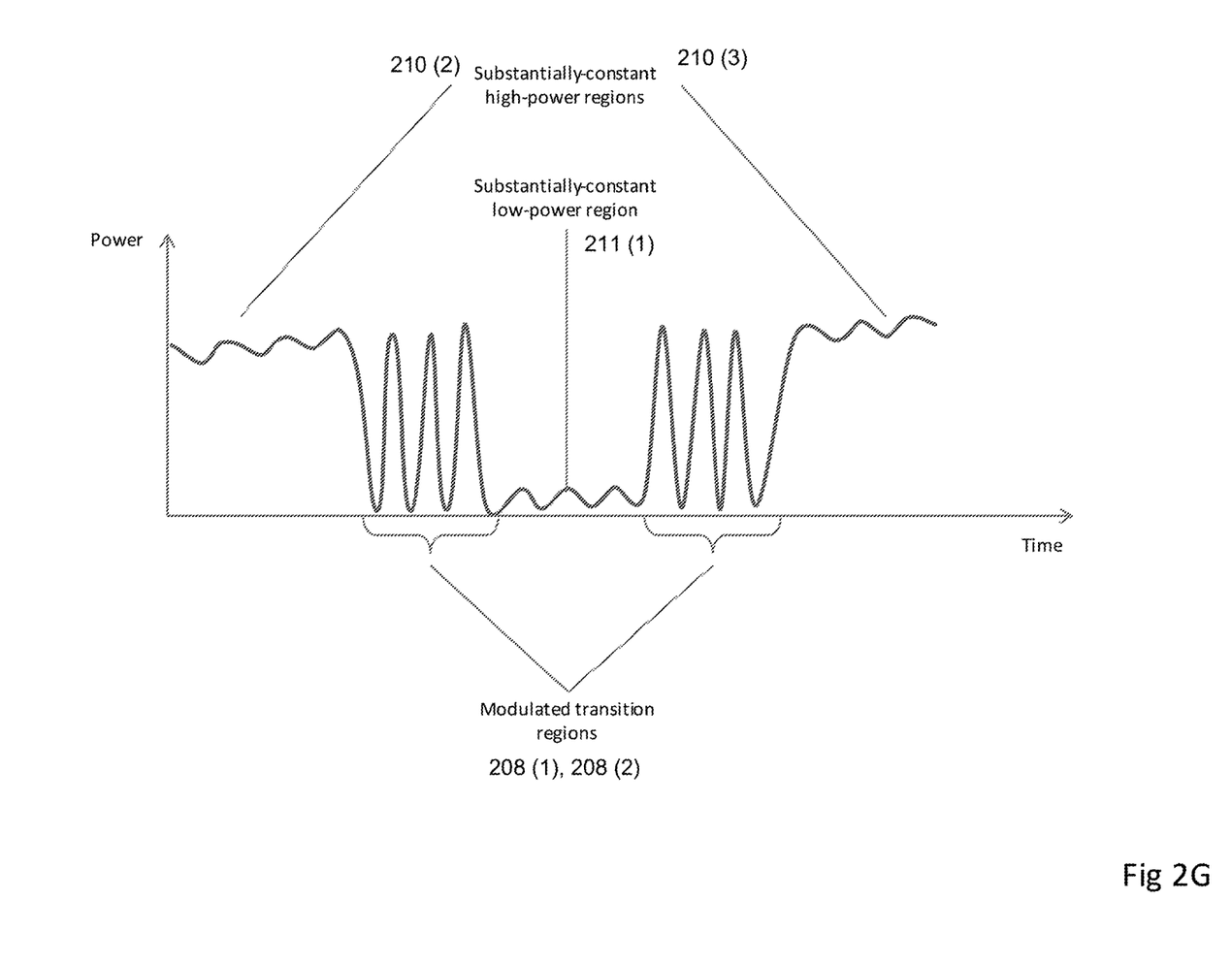
FIG. 2G shows a signal that exhibits a small ripple in nearly-constant sections according to one embodiment.

FIGS. 2F and 2G show examples of signals where the nearly-constant sections exhibit some signal variations. FIG. 2F shows a signal that exhibits constantly rising power over high-power sections and constantly decreasing power over low-power sections according to one embodiment. FIG. 2G shows a signal that exhibits a small ripple in nearly-constant sections according to one embodiment.

In some embodiments, as described above, the low-power sections exhibit a power which is small and close to zero. In other embodiments, on the other hand, the low-power sections exhibit a large negative power. For instance, the high-power section may have a substantially constant value of +12V (or +6V, +1V) and the low-power sections may have a substantially constant value of −12V (or −6V, −1V). As in other embodiments, the low- and high-power sections are separated by modulated interface regions where data is encoded. In such embodiments, the signal somewhat resembles an AC signal (varying between a positive and a negative value); this may be amenable to some lamps whose electronics are suited to an AC-like signal.

Figure 3:
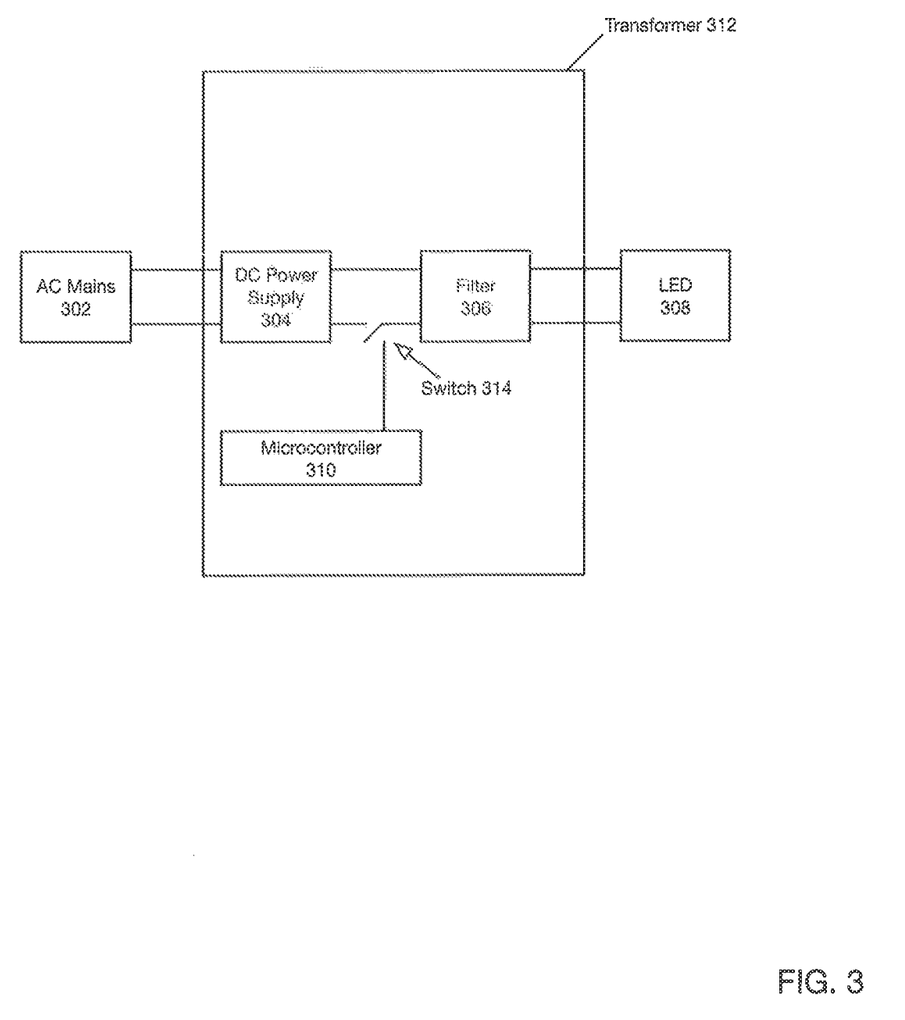
FIG. 3 depicts a block diagram of a transformer for driving an LED lamp according to one embodiment.

FIG. 3 depicts a block diagram of a transformer for driving an LED lamp according to one embodiment. As described previously, transformer 312 provides power to LED lamp 308. However, in addition in accordance with the present invention, transformer 312 is adopted to provide a transfer of data using the same power signal used to power LED lamp 308. As shown in FIG. 3, AC mains block 302 provides an AC signal to transformer 312. Transformer block 312 further comprises DC power supply 304, filter 306, microcontroller 310 and switch 314.

Referring to FIG. 3, DC power supply 304 generates pulsed variable signal 204 with high and low-power sections 206 (not shown in FIG. 3) from an AC signal provided by AC mains block 302. Microcontroller 310 receives a stream of data to be modulated and generates appropriate symbol patterns which are provided to filter 306 to control the modulation of data onto the pulsed variable signal 204.

Figure 4:
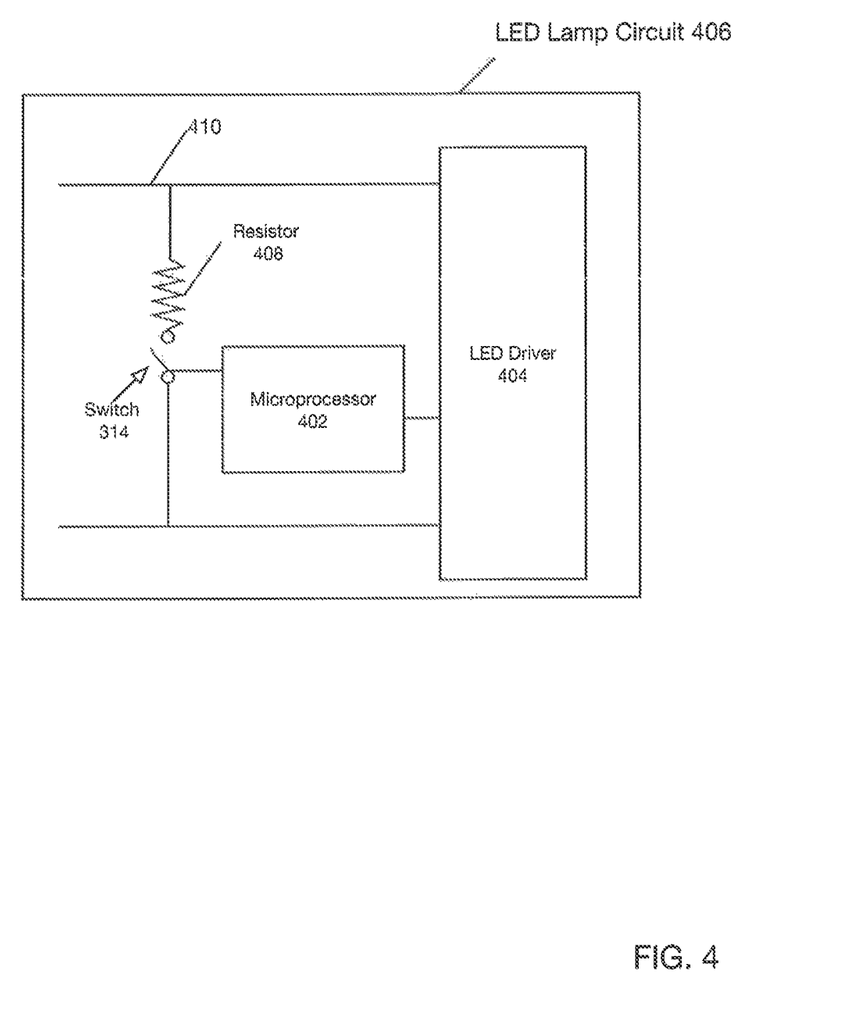
FIG. 4 depicts a block diagram of a portion of an LED lamp circuit which may be utilized to transmit data from the LED lamp to a transformer or power supply.

The lamp comprises a microprocessor or chipset, perhaps in a lamp driver for instance placed in the base of the lamp, which is used to interpret (decode) data contained in the modulated signal 220. Such decoding or demodulating functionality (i.e. chips and software) is well known and commercially available. For example, in one embodiment, the microprocessor 403 in the embodiment of FIG. 4 is configured to demodulate and decode the data and to cause the lamp to respond accordingly.

While the description above addresses communicating data to the lamp, the present invention also facilities communicating data from the lamp. In one embodiment, the present relates to a method for transmitting data from an LED lamp coupled to a power source, comprising selectively coupling a resistor in the LED lamp to the power source based upon at least one data symbol, thereby causing a modulation of a current on a power line. For example, FIG. 4 shows a block diagram of a portion of an LED lamp circuit of one embodiment for transmitting data from the LED lamp to a transformer or power supply. In this embodiment, LED lamp circuit 406 may further comprise MOSFET acting as a switch 314, microprocessor 402, resistor 408, input power line 410 and LED driver 404. As depicted in FIG. 4, resistor 408 is connected in series with MOSFET 314 (acting as switch). Microprocessor 402 operates to control opening and closing of switch 314 and thus controls whether resistor 408 is coupled to input power line 410 or not through MOSFET 314 acting as a switch. In other words, a signaling operation is achieved under control of microprocessor 402, which selectively enables or disables switch 314, thereby achieving an impedance modulation of LED lamp circuit 406. In particular, according to one embodiment, if LED lamp circuit 406 is drawing power from a transformer (not shown in FIG. 4), according to Ohm's law, the relationship between power and current is I=V/R. If the voltage is 12 V at 1A, the associated power 12 W. According to this example resistor 408 is 1200 ohms. Selectively invoking a 1200 ohm resistor 408 on or off power line 410 via microprocessor results in a 1% impedance modulation. In other embodiments, other resistor values are possible, such as 10 Ohms, 100 Ohms, 1,000 Ohms, 10,000 Ohms, 100,000 Ohms, or 1,000,000 Ohms.

The rate at which such impedance modulation is effected may be controlled by an ASCII or carrier frequency, and may be, for example, 10-50 KHz, and in particular, for example, 30 KHz. Such an impedance modulation may be utilized for signaling between LED lamp circuit 406 and a transformer (not shown in FIG. 4). In one embodiment, the modulation uses a carrier modulated with data. Examples of suitable and known modulations methods include AM, FM, ASK, FSK, and QP SK.

In one embodiment, resistor 408 is used not only to control a signaling operation between an LED lamp and a transformer or power supply as described above, but also to improve performance of the circuit. For example, momentarily providing a 1200 Ohm or other suitable load across the input power lines under microprocessor control, draws additional power during startup, which can help with the startup processes of certain electronic transformers.

In yet another embodiment, the present invention relates to a system and method for bi-directional data communication between a power-side component and a powered device over a metallic link. The powered device may be any known electrical device for transforming electrical energy into heat, light/electromagnetic radiation, and mechanical/rotational energy. Examples of common powered devices include, for example, lamps, microwaves, air/water heaters, and motors. The power-side component may be any known component disposed between a power supply and the powered device. Examples of power-side components include transformers, controllers, dimmers, and switches. In one embodiment, the power-side component transmits data by modulating a power signal, and the powered device transmits data by selectively invoking a resistor to provide impendence modulation. In one embodiment, the power-side component communicates in accordance with the embodiment of FIGS. 2A-E and 3 and associated text as set forth above, and the powered component communicates in accordance with FIG. 4 and associated text as set forth above.

In one embodiment, the power-side component is a transformer and the powered device is an LED lamp connected to the transformer over a power line. The transformer comprises a first microprocessor, which is adapted to modulate the power signal in one or more interface regions based upon at least one data symbol to generate a modulated signal having one or more modulated portions, each modulated portion having a first average power, each of the interface regions comprising adjacent portions of a high-power section and a low-power section, the adjacent portions having a second average portion. The modulated signal is provided to the LED lamp via the power line. The LED lamp comprises a second microprocessor which is configured to selectively couple a resistor in the LED lamp to the power line based upon at least one second data symbol to generate a modulated power line signal. Because the transformer is coupled to the powerline, it senses the modulated power line signal. In such an embodiment, the first microprocessor is adapted to decode transmissions of the second microprocessor and the second microprocessor is adapted to decode transmissions of the first microprocessor. This bi-directional configuration is described in connection with FIG. 5.

Figure 5:
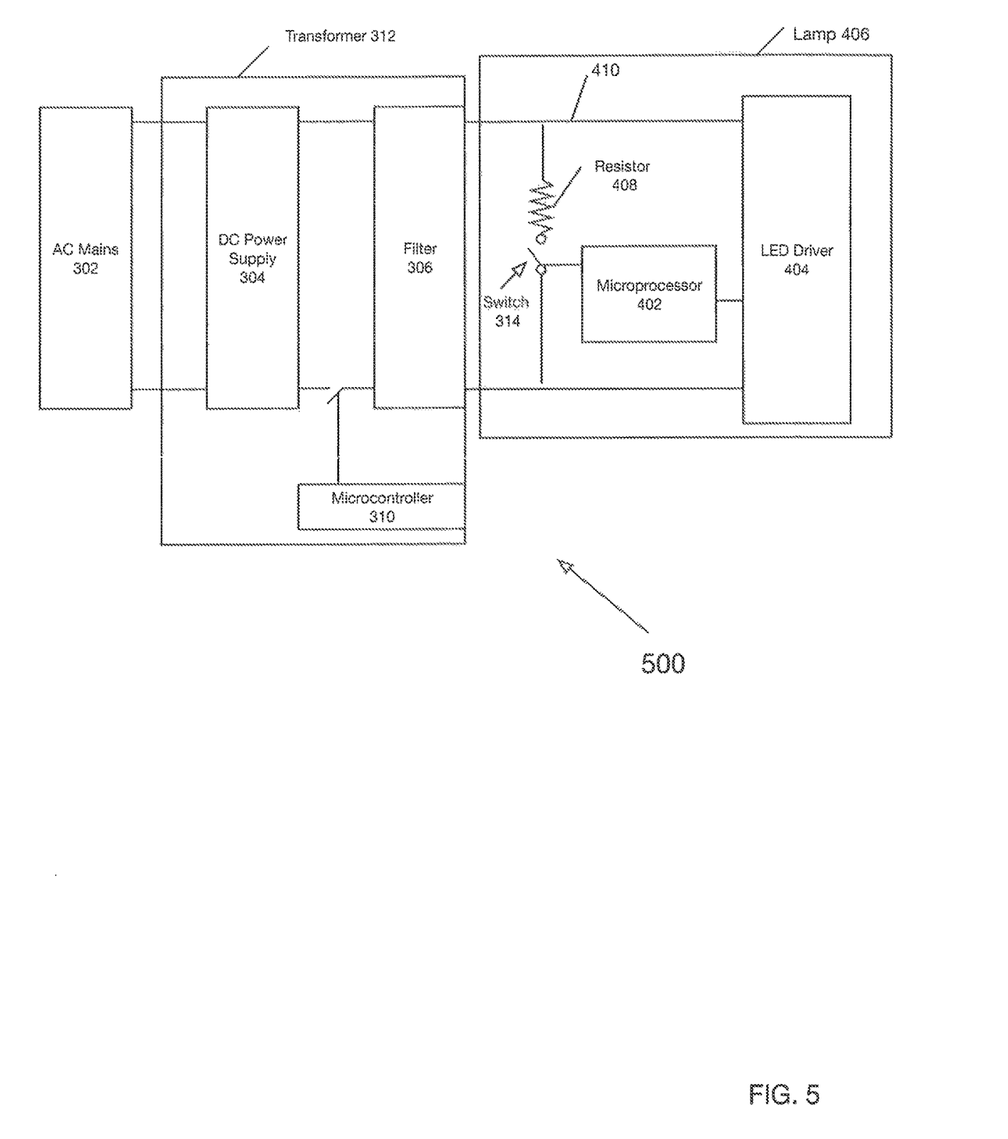
FIG. 5 is a block diagram of a bi-directional communication circuit between a lamp and a transformer over a power line according to one embodiment.

Referring to FIG. 5, one embodiment of a bi-direction system of the present invention is disclosed. FIG. 5 is a block diagram of a bi-directional communication circuit between a lamp and a transformer over a power line according to one embodiment. As shown in FIG. 5, transformer 312 is coupled to lamp 406 via powerline 410. In this configuration, a bidirectional communication channel is established between transformer 312 and lamp 406. Transformer 312 communicates with lamp 406 utilizing a modulation scheme described with reference to FIGS. 2D-2G and FIG. 3. That is, transformer 312 performs data modulation in interface regions 208 between high and low-power sections 210, 211. Furthermore, data symbols modulated onto pulsed variable signal 204 may include an equal number of '0' and '1' bits in order to prevent flicker or other undesirable effects in the output of lamp 406 as previously described.

Lamp 406, on the other hand, may communicate with transformer 312 in the reverse direction by selectively invoking resistor 408 via switch 314 as previously described. In this manner a bidirectional communication channel is established between lamp 406 and transformer 312.

In some embodiments, several lamps can be addressed by the communication protocol described herein. In one embodiment, the lamps are low-voltage MR16 lamps connected to a driver. The driver can communicate with the lamps individually or in group.

In some embodiments, transformer 312 is further connected to a communication network (for instance, a wireless network such as wi-fi, Bluetooth, Zigbee, Lifi; or a wired network such as DMX, Dali, PLC). In such embodiments, the transformer may serve to send and receive data to and from the communication network, and send and receive data to and from the lamps it powers, as described in this disclosure. Thus, the transformer may serve as a gateway for transmitting data between a communication network and the lamps. The term "transformer" is used here for element 312, however, it may also be described as a power supply, controller or driver.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A method for transmitting data over a power signal to at least one lamp, said power signal comprising alternating high-power and low-power sections, said method comprising:
modulating said power signal in one or more interface regions based upon at least one data symbol to generate a modulated signal having one or more modulated portions, each modulated portion having a first average power, each of said interface regions comprising adjacent portions of a high-power section and a low-power section, said adjacent portions having a second average power;
wherein said first average power is about the same as said second average power.

2. The method of claim 1, wherein said first average power is within 10% of said second average power.

3. The method of claim 1, wherein said first average power is no less than 50% of a third average power of said high-power section.

4. The method of claim 1, wherein power of said low-power sections and of said high-power sections is substantially constant.

5. The method according to claim 1, wherein the duration of said interface regions are less than 10% of the duration of said power signal.

6. The method according to claim 4, wherein said substantially constant sections are periodic with a period in the range 10 Hz-500 KHz, and a modulation of data in said interface regions has a period in the range 50 Hz-500 MHz.

7. The method according to claim 1, wherein each of said at least one data symbol is encoded using an equal number of zero bits and one bits.

8. The method according to claim 1, wherein said power signal is derived from an AC signal.

9. The method according to claim 8, wherein said power signal has a frequency of alternating high and low sections based upon a frequency of an AC signal.

10. The method according to claim 1, wherein said modulating does not cause flickering of said LED lamp.

11. A method for transmitting data from an LED lamp coupled to a power source, said method comprising:
selectively coupling a resistor in said LED lamp to said power source based upon at least one data symbol, wherein said selectively coupling causes a modulation of a current on a power line.

12. The method according to claim 11, wherein said modulation comprises a carrier signal and a data signal.

13. The method according to claim 11, wherein said modulation has a frequency of about 10-50 KHz.

14. The method according to claim 11, wherein said selectively coupling is controlled by a microprocessor.

15. The method according to claim 11, wherein said resistor is enabled to assist in startup of said LED lamp.

16. The method according to claim 11, wherein said resistor is approximately 1200 Ohms.

17. A bi-directional data communication system for bi-directional data communication between a power-side component and a powered device over a metallic link, comprising:
a power-side component configured to transmit first data to a powered device by modulating a power signal with said first data over a powerline,
a powered device configured to receive and demodulate said first data and configured to transmit second data to said power-side component by selectively invoking a resistor to provide impendence modulation; and
wherein said power-side component is also configured to sense said impendence modulation and decode said second data.

18. The system of claim 17, wherein said powered device is one of a lamp, microwave, air/water heater, or motor, and said power-side component is one of a transformer, controller, driver, dimmer, or switch.

19. The system of claim 18, wherein said power-side component comprises a first microprocessor, which is adapted to modulate said power signal in one or more interface regions based upon at least one first data symbol to generate a first modulated signal having one or more modulated portions, each modulated portion having a first average power, each of said interface regions comprising adjacent portions of a high-power section and a low-power section of said power signal, said adjacent portions having a second average power, wherein said first average power is about the same as said second average power, wherein said powered device comprises a second microprocessor which is configured to selectively couple a resistor in said powered device to said power line based upon at least one second data symbol to generate a second modulated signal.

20. The system of claim 19, wherein said first microprocessor is adapted to decode transmissions of said second microprocessor and said second microprocessor is adapted to decode transmissions of said first microprocessor.

21. The system of claim 19, wherein each of said at least one first data symbol is encoded using an equal number of zero bits and one bits.

22. The system of claim 19, wherein said powered device is configured to selectively couple said resistor during said high-power section of said power signal.

23. A bi-directional data communication system for bi-directional data communication between a power-side component and a powered device over a metallic link, comprising:
- a power-side component configured to transmit first data to a powered device by modulating a power signal with said first data over a powerline using a first modulation protocol,
- a powered device configured to receive and demodulate said first data and configured to transmit second data to said power-side component by modulating a signal with said second data over said powerline using a second modulation protocol different from said first modulation protocol; and
- wherein said power-side component is also configured to demodulate said second data.

24. The system of claim 23, wherein said signal is said power signal.

25. The system of claim 23, wherein said powered device is one of a lamp, microwave, air/water heater, or motor, and said power-side component is one of a transformer, controller, driver, dimmer, or switch.

26. The system of claim 23, wherein said power-side component comprises a first microprocessor, which is adapted to modulate said power signal in one or more interface regions based upon at least one first data symbol to generate a first modulated signal having one or more modulated portions, each modulated portion having a first average power, each of said interface regions comprising adjacent portions of a high-power section and a low-power section of said power signal, said adjacent portions having a second average power, wherein said first average power is about the same as said second average power, wherein said powered device comprises a second microprocessor which is configured to selectively couple a resistor in said powered device to said power line based upon at least one second data symbol to generate a second modulated signal.

* * * * *